US012566279B2

(12) United States Patent
Mägi et al.

(10) Patent No.: US 12,566,279 B2
(45) Date of Patent: Mar. 3, 2026

(54) SYSTEM AND METHOD FOR CLASSIFYING MATERIAL

(71) Applicant: GScan OÜ, Tallinn (EE)

(72) Inventors: Märt Mägi, Saue parish (EE); Egils Avots, Tartu (EE); Kadir Aktas, Harjumaa (EE)

(73) Assignee: GScan OÜ, Tallinn (EE)

( * ) Notice: Subject to any disclaimer, the term of this patent is extended or adjusted under 35 U.S.C. 154(b) by 172 days.

(21) Appl. No.: 18/414,847

(22) Filed: Jan. 17, 2024

(65) Prior Publication Data

US 2024/0255672 A1     Aug. 1, 2024

(30) Foreign Application Priority Data

Feb. 1, 2023     (EP) ..................................... 23154494

(51) Int. Cl.
*G01V 5/222* (2024.01)
(52) U.S. Cl.
CPC .................................. *G01V 5/222* (2024.01)
(58) Field of Classification Search
None
See application file for complete search history.

(56) References Cited

U.S. PATENT DOCUMENTS

2005/0041772 A1* 2/2005 Nishide ................ G01N 23/046
                                                              378/19
2021/0003735 A1* 1/2021 Georgadze ............... G01V 5/22
2025/0058358 A1* 2/2025 Kumar .................... B07C 5/342

OTHER PUBLICATIONS

European Patent Office, Extended European Search Report, Application No. 23154494.1, Dated Jun. 7, 2023, 9 pages.
Gholamreza Anbarjafari et al, "Atmospheric ray tomography for low-Z materials: implementing new methods on a proof-of-concept tomograph", Arxiv.org, Cornell University Library, 201 Olin Library Cornell University Ithaca, NY 14853, Mar. 1, 2021, 14 pages.

* cited by examiner

*Primary Examiner* — Hoon K Song
(74) *Attorney, Agent, or Firm* — Ziegler IP Law Group, LLC.

(57) ABSTRACT
A system for classifying materials includes at least one hodoscope with at least one first (2D sensitive) detector unit and at least one second (2D sensitive) detector unit, wherein first detector unit and second detector unit are spaced apart by predetermined first distance to configure a volume of interest (VOI) therebetween to receive therein samples of materials within VOI. The system also includes a processor communicably coupled to at least one hodoscope, wherein processor is configured to reconstruct VOI using plurality of spatial resolution units, track high energy particles passing through VOI by identifying spatial resolution units interacting with high energy particles, create dataset using one or more features associated with each of samples of materials, and train machine learning model using dataset of each of samples of materials for classifying materials. Disclosed also a method for classifying materials.

14 Claims, 2 Drawing Sheets

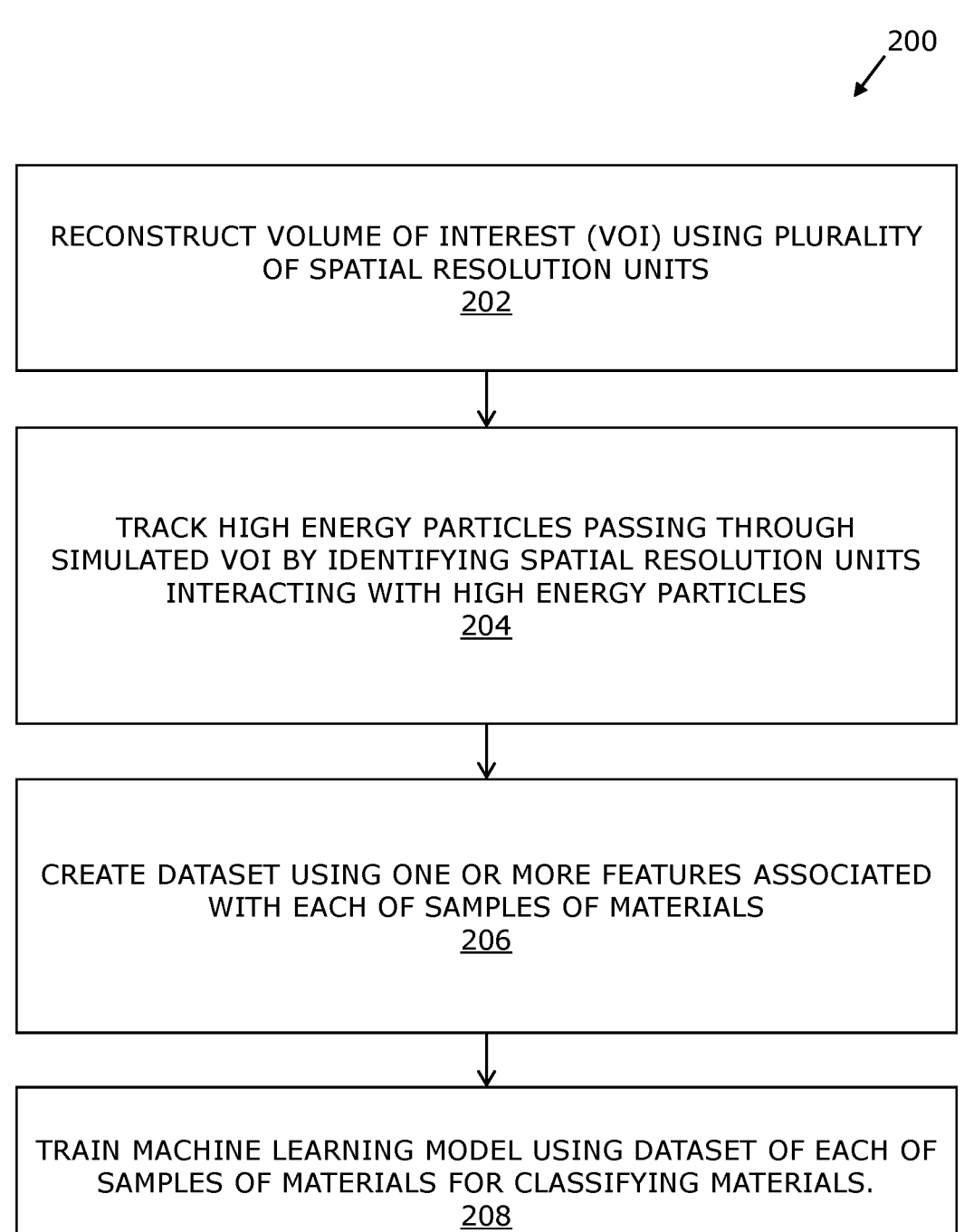

200

RECONSTRUCT VOLUME OF INTEREST (VOI) USING PLURALITY
OF SPATIAL RESOLUTION UNITS
202

TRACK HIGH ENERGY PARTICLES PASSING THROUGH
SIMULATED VOI BY IDENTIFYING SPATIAL RESOLUTION UNITS
INTERACTING WITH HIGH ENERGY PARTICLES
204

CREATE DATASET USING ONE OR MORE FEATURES ASSOCIATED
WITH EACH OF SAMPLES OF MATERIALS
206

TRAIN MACHINE LEARNING MODEL USING DATASET OF EACH OF
SAMPLES OF MATERIALS FOR CLASSIFYING MATERIALS.
208

FIG. 2

SYSTEM AND METHOD FOR CLASSIFYING MATERIAL

TECHNICAL FIELD

The present disclosure relates to systems for classifying materials. The present disclosure also relates to methods for classifying materials.

BACKGROUND

Atmospheric Ray Tomography emerged in the early 2000s, has rapidly expanded in recent years, including low-Z detection. Atmospheric ray tomography is an imaging technique using natural cosmic-ray radiation characterising a diverse range of objects that are impossible to be imaged by traditional imaging techniques. Typically, the materials are imagined using atmospheric ray tomography. Low-Z materials are materials with a low atomic number having a small number of protons in the nucleus of their atoms. For example, low-Z materials include hydrogen, helium, and carbon.

Security applications currently employ radiation detectors and X-ray scanners at border crossings to prevent the illicit transport of fissile material. However, the said technique has limited detection capability. The X-ray radiography systems have various limitations because they cannot be used on occupied vehicles, and the energy and dose are too low to pass large depths of matter, probing the innermost volumes of very large objects of interest. In contrast, high energy particle (such as muons) is deeply penetrating and transit through all kinds of materials. Furthermore, muon scattering is sensitive to material density and the atomic number of materials. Therefore, different materials can be discriminated against by muon scattering. However, the use of high energy particle for imaging and material detection is still not very common. The combination of material classification and high penetration makes atmospheric ray tomography a sensitive probe useful for industrial and security applications.

Therefore, in light of the foregoing discussion, there exists a need to overcome the aforementioned drawbacks associated with conventional imaging techniques.

SUMMARY

The present disclosure seeks to provide a system for classifying materials. The present disclosure also seeks to provide a method for classifying materials. An aim of the present disclosure is to provide a solution that overcomes at least partially the problems encountered in prior art.

In one aspect, an embodiment of the present disclosure provides a system for classifying materials, the system comprising:

at least one hodoscope comprising at least one first (2D sensitive) detector unit and at least one second (2D sensitive) detector unit, wherein the first detector unit and the second detector unit are spaced apart by a predetermined first distance to configure a volume of interest (VOI) between the first detector unit and the second detector unit, wherein the VOI is configured to receive therein samples of materials within the VOI; and a processor communicably coupled to the at least one hodoscope, wherein the processor is configured to:
reconstruct the VOI using a plurality of spatial resolution units, track high energy particles passing through the VOI by identifying spatial resolution units interacting with the high energy particles, wherein each of the identified spatial resolution units represent one or more features associated with the samples of materials received in the VOI, create a dataset using the one or more features associated with each of the samples of materials, wherein the dataset of each of the samples of materials include a unique data-signature, and train a machine learning model using the dataset of each of the samples of materials for classifying the materials.

In another aspect, an embodiment of the present disclosure provides a method for classifying materials, the method comprising:

reconstructing a volume of interest (VOI) using a plurality of spatial resolution units, wherein the VOI is configured to receive therein samples of materials within the VOI, tracking high energy particles passing through the VOI by identifying spatial resolution units interacting with the high energy particles, wherein each of the identified spatial resolution units represent one or more features associated with the samples of materials received in the VOI, creating a dataset using the one or more features associated with each of the samples of materials, wherein the dataset of each of the samples of materials include a unique data-signature, and training a machine learning model using the dataset of each of the samples of materials for classifying the materials.

Embodiments of the present disclosure substantially eliminate or at least partially address the aforementioned problems in the prior art, and enable the dataset that is utilized for training the machine learning model for the classification of the sample of material. The aforementioned system and method can detect low-Z materials and enable accurate high energy particle tracking.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 2 illustrates steps of a method for classifying materials, in accordance with an embodiment of the present disclosure.

Figure 1:
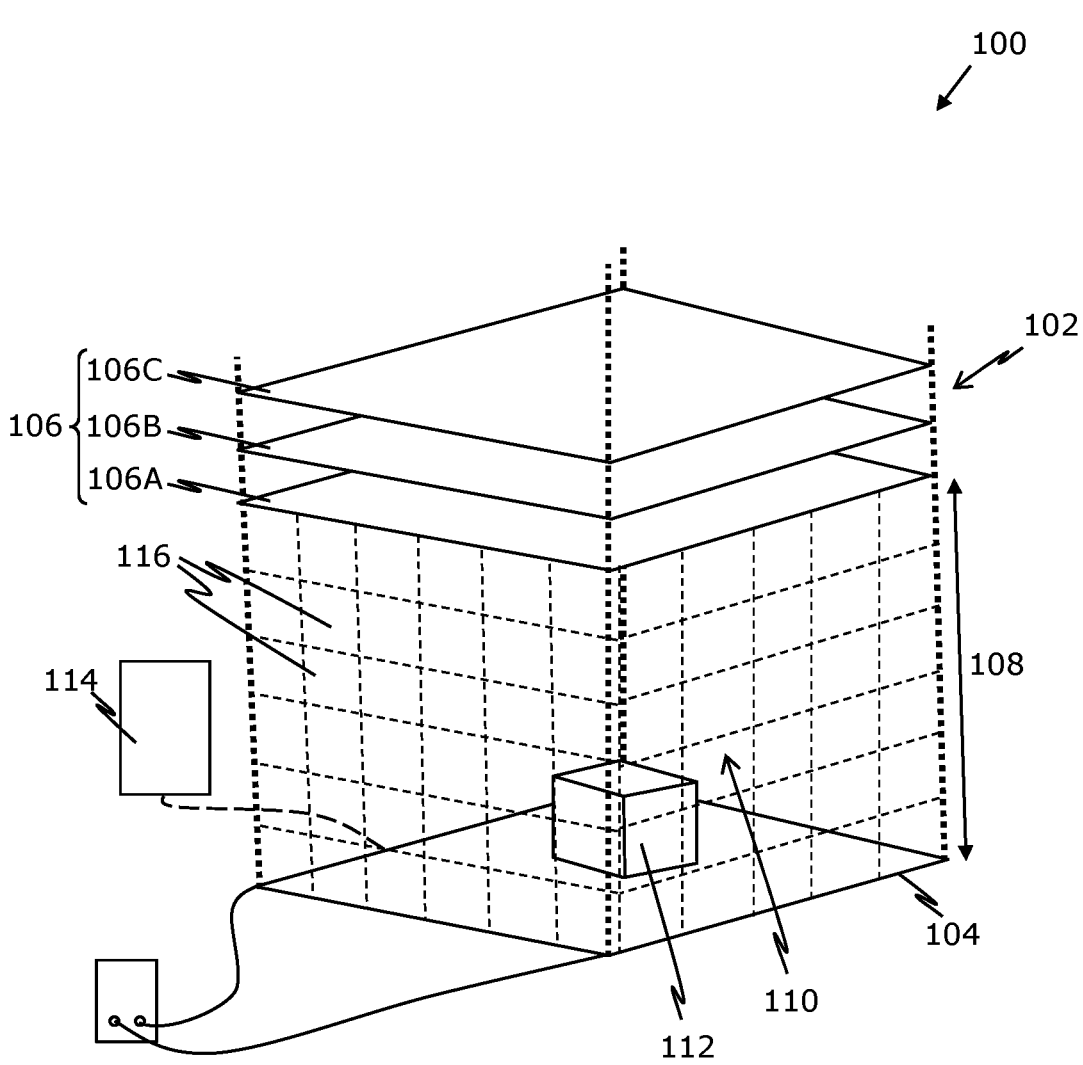
FIG. 1 is a schematic illustration of a system for classifying material, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for classifying materials, the system comprising:

at least one hodoscope comprising at least one first (2D sensitive) detector unit and at least one second (2D sensitive) detector unit, wherein the first detector unit and the second detector unit are spaced apart by a predetermined first distance to configure a volume of interest (VOI) between the first detector unit and the second detector unit, wherein the VOI is configured to receive therein samples of materials within the VOI; and a processor communicably coupled to the at least one hodoscope, wherein the processor is configured to:

reconstruct the VOI using a plurality of spatial resolution units, track high energy particles passing through the VOI by identifying spatial resolution units interacting with the high energy particles, wherein each of the identified spatial resolution units represent one or more features associated with the samples of materials received in the VOI, create a dataset using the one or more features associated with each of the samples of materials, wherein the dataset of each of the samples of materials include a unique data-signature, and train a machine learning model using the dataset of each of the samples of materials for classifying the materials.

In another aspect, an embodiment of the present disclosure provides a method for classifying materials, the method comprising:

reconstructing a volume of interest (VOI) using a plurality of spatial resolution units, wherein the VOI is configured to receive therein samples of materials within the VOI, tracking high energy particles passing through the VOI by identifying spatial resolution units interacting with the high energy particles, wherein each of the identified spatial resolution units represent one or more features associated with the samples of materials received in the VOI, creating a dataset using the one or more features associated with each of the samples of materials, wherein the dataset of each of the samples of materials include a unique data-signature, and training a machine learning model using the dataset of each of the samples of materials for classifying the materials.

The present disclosure provides aforementioned system for classifying the materials and aforementioned method for classifying the materials. The aforementioned system is configured to detect low-Z materials and enable accurate tracking of high energy particle. Moreover, the aforementioned system and method is configured to distinguish between the different samples of materials for classifying thereof. It will be appreciated that the processor is configured to train the machine learning model based on the dataset to enable the easy classification of the materials.

Throughout the present disclosure, the term "hodoscope" as used herein refers to a device for detecting high energy particles and is configured to determine the trajectories of the high energy particles. Typically, the hodoscope is a particle detector device that is used to track the path of high energy particles. The at least one hodoscope consists of a series of thin parallel wires or thin plates (such as at least one first (2D sensitive) detector unit and at least one second (2D sensitive) detector unit) that are arranged in a plane. In particular, the at least one hodoscope comprises the plurality of fibres arranged within the at least one first detector unit and the at least one second detector unit. Optionally, the plurality of fibres are single cladding scintillating fibres. During operation, the high energy particle passes through the at least one hodoscope, it causes ionization of the atoms in the at least one first detector unit and the at least one second detector unit, resulting in a pulse (such as current) that is detected by the plurality of fibres or detector unit. By measuring the timing and intensity of the pulses at different points along the at least one hodoscope helps in determining the position and momentum of the high energy particle. Beneficially, the at least one hodoscope is used in particle physics experiments, medical imaging, radiation detection and so forth.

The term "detector unit" as used herein refers to an assembly that enables the tracking and detection of high energy particles. Typically, the detector unit is configured to track the paths of the high energy particles as they pass therethrough. Typically, the high energy particles arrive from outer space and are mainly protons, nuclei of hydrogen, nuclei of helium and heavier nuclei (such as Uranium, Plutonium). Notably, when the high energy particles arrive at Earth, they collide with the nuclei of atoms in the upper atmosphere, thereby creating more particles, mainly pions. The charged pions gradually decay, emitting particles called muons. Moreover, the interaction of the muons with matter is very little and can travel through the atmosphere and penetrate below ground. Generally, the muons reach earth with an average velocity of about 0.994 times the speed of light. Furthermore, one muon passes through a 1 $cm^2$ area per minute. In this regard, the high energy particles, interact very little with matter and can travel through metres of dense material before being stopped. Suitably, the high energy particles easily pass through the detector unit. Beneficially, the detector unit is arranged to detect the travelling path of the high energy particles which is further used in classifying the material.

In particular, the at least one first detector unit and the at least one second detector unit are 2D sensitive detector unit arranged to detect and determine the trajectories of the high energy particles. Typically, the 2D sensitive detector unit is a type of detector plate that is used to measure the position of the high energy particle. In the 2D sensitive detector unit, the position of the particle can be determined in two dimensions, typically by measuring the amount of charge generated at different points on the surface of the 2D sensitive detector unit. The 2D sensitive detector unit are often used in particle physics experiments, but they have also found applications in other fields, such as medical imaging and industrial inspection.

Herein, the first detector unit and the second detector unit are stacked upon each other in a spaced apart by the predetermined first distance to configure the volume of interest (VOI) between the first detector unit and the second detector unit. The term "volume of interest" as used herein refers to a space formed between the first detector unit and second detector unit utilized to place the sample therein to determine the material of the sample. Generally, each material has a different absorptions rate for the high energy particle, based on the absorption the sample can be determined. For example, the uranium having atomic number 92 is placed in the VOI. The system identifies the sample based on the absorption.

Optionally, the samples of materials having predetermined size and is placed at a predetermined position within the VOI. In this regard, the samples of materials have the predetermined size placed within the VOI. Typically, the predetermined size is a size that has been established for the sample. Suitably, the size of the samples of materials are fixed size that has been determined before placing it in the VOI. Optionally, each of the samples of materials has the same dimensions. For example, a cube-shaped material with a length of 60 mm is placed in the VOI.

Notably, the predetermined size of the sample of material enables in generating the precision of our estimates. Moreover, the sample of material is placed in the predetermined position in the VOI. The term "predetermined size" as used herein refers to a size that has been chosen or set before it is used. Moreover, the predetermined sizes ensure the consistency of size while generating the dataset. Optionally, the predetermined size also ensures the alignment of each of the sample of material in the VOI at the same place. More optionally, the sample of the material have different size and may be place at any position within the VOI.

The term "processor" as used herein refers to a hardware, software, firmware, or a combination of these configured to control operation of the system. In this regard, the processor performs several complex processing tasks to generate the dataset. The processor is communicably coupled to other components of the system wirelessly and/or in a wired manner. In an example, the processor may be implemented as a programmable digital signal processor (DSP). In another example, the processor may be implemented via a cloud server that provides a cloud computing service. Optionally, the processor is communicably coupled to the first detector unit and the second detector unit using a communication network. The communication network may be a wired network, a wireless network, or any combination thereof. Examples of the communication network include, but are not limited to, Local Area Networks (LANs), Wide Area Networks (WANs), Internet, radio networks and telecommunication networks. It will be appreciated that the processor is operably coupled with the at least one hodoscope configured to classify the materials. Moreover, the processor is configured to reconstruct the VOI using the plurality of spatial resolution units. Furthermore, the processor is configured to track high energy particles passing through the VOI by identifying spatial resolution units interacting with the high energy particles. Furthermore, the processor is arranged to create the dataset using the one or more features associated with each of the samples of materials and to train the machine learning model using the dataset of each of the samples of materials for classifying the materials.

Optionally, the processor is configured to track the high energy particles passing through the VOI by tracking the high energy particles passing through the first detector unit and/or the second detector unit. In this regard, the processor is operably coupled with the at least one hodoscope to track the high energy particle. Moreover, the processor is configured to identify the samples of materials. Notably, when the high energy particles pass through the first detector unit and/or the second detector unit the processor coupled thereof with the hodoscope is configured to track the high energy particle.

The term "spatial resolution units" as used herein refers to the number of pixels or voxels utilized in the construction of the VOI. Typically, the plurality of spatial resolution units is used to create the VOI. Notably, a straight line is passed through the plurality of spatial resolution units formed by the VOI between the first detector unit and the second detector unit. Moreover, the high energy particle is traced through the VOI and the plurality of spatial resolution units interacted with the high energy particle is registered. The data is saved in the dataset having information of the total number of the high energy particles passing through the given plurality of spatial resolution units or the average scattering of the high energy particles in the said plurality of spatial resolution units.

Optionally, the VOI and the plurality of spatial resolution units are cubic in shape, and wherein each of the spatial resolution units has a volume, multiplying and arranging, constitute the VOI. In this regard, the VOI is formed using the plurality of spatial resolution units. Suitably, the VOI and the plurality of spatial resolution units are formed in the cubic shape. It will be appreciated that each of the spatial resolution units has the same dimension arranged to form VOI. Optionally, the VOI and the plurality of spatial resolution units are in cuboidal shape.

The term "dataset" as used herein refers to an information stored for the one or more features associated with each of the samples of materials. Suitably, the dataset (usually called a training dataset) is configured to save the data associated with the corresponding samples of materials. It will be appreciated that the dataset of each of the samples of materials includes the unique data-signature. The term "unique data-signature" as used herein refers to the data associated with each of the unique material. Typically, the unique data-signature is used to classify the material. Moreover, the unique data-signature is used to train the machine learning model.

The term "machine learning model" as used herein refers to a subset of artificial intelligence (AI) in which models are trained using the dataset. For example, the dataset may be data, such as dataset associated with the one or more features associated with each of the samples of materials, unique data-signature, and so forth, stored in a cloud server, to train the machine learning model. In this regard, the machine learning model is used for classifying the materials. Optionally, the one or more features associated with the samples of materials comprise measure of one of a scattering angles or a number of high energy particles passing through each of the spatial resolution units interacting with the high energy particles. Optionally, the one or more features associated with the samples of materials comprise measure of one of a scattering angles. In this regard, the scattering angle is the angle by which the high energy particle is deflected by the sample of material within the spatial resolution units forming the VOI. Optionally, the one or more features associated with the samples of materials comprise the number of high energy particles passing through each of the spatial resolution units interacting with the high energy particles. It will be appreciated that the processor is configured to record the data associated with the one or more features to form the dataset.

Optionally, the machine learning technique is selected from at least one of: Linear Discriminant Analysis (LDA), Neural Network (NN), LDA One-vs-One (1v1). Optionally, the machine learning model is Linear Discriminant Analysis (LDA). Optionally, the machine learning model is Neural Network (NN). Optionally, the machine learning model is LDA One-vs-One (1v1). Optionally, GEANT4 Monte Carlo simulation and classifiers using machine learning model are used to classify the materials. Optionally, the machine learning model is configured to reduce the redundancy from system. The one or more machine learning models are trained using the dataset. For example, the machine learning models are trained to classify each sample of material. Optionally, the machine learning model is re-trained based on new samples. Typically, the LDA is technique used in machine learning model and pattern recognition. Beneficially, the LDA is flexible and powerful in generating the patterns. The LDA is linear combination of features that maximizes the separation between each of the sample of material. LDA is configured to predict the sample based on one or more features. The NN is made up of layers of interconnected neurons, which process and transmit information. The NN are capable of learning and adapting based on the data they receive, and are able to perform tasks such as classification, regression, and clustering. Neural networks are trained using datasets and an optimization algorithm, in order to minimize the error between the predicted output. In LDA (1v1), model is trained for each sample of material. During prediction, the classifier takes the dataset and applies each of the LDA 1v1 models to it, then combines the results to determine the samples of materials. Beneficially, the LDA 1v1 is efficient, as it requires small training dataset.

Optionally, the processor is configured to create the dataset by:

creating histograms, and defining vector values corresponding to the histograms.

In this regard, the histogram is a graphical representation of the distribution of a dataset, showing the frequency or number of observations within each of a set of bins or intervals. The bins are usually determined in advance, and the data is divided into these bins based on the values of the observations. The vector values corresponding to the histogram is the values of the observations that fall within each of the bins. The vector values corresponding to the histogram can be used to classify materials. Typically, the processor is configured to create the histograms to form the dataset. Herein, the histograms allow to represent the one or more features associated with each of the samples of materials. Moreover, the histograms provide the each sample of material the unique data-signature that allows them to be classified. Furthermore, the information about the scattering angles and a number of high energy particles passing through each of the spatial resolution units interacting with the high energy particles is saved in the histograms. In particular, the histograms forms mean angle histogram and density histogram for each of the samples of materials. In this regard, the mean angle histogram provides an average scattering angle value through each of the spatial resolution units. In contrast, the density histogram provides high energy particles passing through each of the spatial resolution units interacting with the high energy particles. Operatively, a total of four histograms per samples of materials per one measurement to obtain the dataset large enough for training the machine learning model. Notably, multiple measurements are taken. Once the histograms have obtained, the information is saved as the vector values. Every number in the vector represents a bin value for the corresponding histogram.

For example, the corresponding vectors would be:

Angle histogram: $V_a$=[10; 8; 5; 3; 2; 1; 0; 0; 0; 0; 0]

Density histogram: $V_d$=[0; 5; 10; 9; 5; 3; 2; 1; 0; 0; 1]

The vectors associated with the angle histogram and the density histogram are concatenated into a single vector in the form of:

$V_c$=[0; 5; 10; 9; 5; 3; 2; 1; 0; 0; 1; 10; 8; 5; 3; 2; 1; 0; 0; 0; 0; 0]

Similarly, every value has a position in the vector idx, in the form of:

idx=[1; 2; 3; 4; 5; 6; 7; 8; 9; 10; 11; 12; 13; 14; 15; 16; 17; 18; 19; 20; 21; 22]

An algorithm (such as supervised learning) is used in the dataset to provide the one or more features. The obtained features are stored in the descending order, in form of the idx vector:

$V_r$ idx=[7; 8; 13; 14; 19; 20; 9; 10; 1; 2; 3; 15; 16; 17; 18; 4; 5; 6; 11; 12; 21; 22].

The creating of dataset by creating histograms and defining vector values corresponding to the histograms, gives the benefit that by using the vector values for calculation, it eases the calculation and thus also makes calculation faster, because the calculation is not based in information of matrix form anymore. Because there is a large amount of data in the histograms, this is converted and then saved to vector values, for making the calculation easier and faster. Also, with the help of vectorization, it is possible to create shorter runtime for algorithms to calculation. For example with the aforementioned dimensionality reduction method applied to the classification algorithm it is faster to classify objects or materials in realtime.

Optionally, the processor is configured to create the dataset for each of the samples of materials by tracking high energy particles passing through the reconstructed VOI for a pre-determined time period. In this regard, the processor is set up to from the dataset for each of the samples of materials by tracking the high energy particles as they pass through the VOI. To create the dataset, the processor is configured to track the movement of the high energy particles as they pass through the VOI for a set amount of time. Typically, the pre-determined time period is a specific length of time that has been established to allow the samples of materials to be placed within the VOI. Optionally, the pre-determined time periods can be set in various units of time, such as seconds, minutes, hours, days, weeks, or so forth. Moreover, the processor configured to record the position, velocity, energy, and other properties of the high energy particles for pre-determined time to classify the samples of materials. The data collected may be used to create the dataset for each sample of material and is used for constructing training dataset, testing dataset or developing models to predict the samples of materials.

Optionally, the processor is configured to create the dataset for each of the samples of materials by tracking high energy particles passing through the at least one hodoscope.

In this regard, the high energy particles passing through the at least one hodoscope are being tracked and the information associated is collected by the processor. The said information may include the energy, position, or other characteristics of each high energy particles. The processor is configured to use the information to create the dataset, to form the histogram. For example, the histogram depicts the distribution of the high energy particle energies in a given sample of materials, or the distribution of the high energy particles hitting different positions in the hodoscope.

The histograms generated from the data is collected by the processor and is used for identifying patterns, trends, or anomalies in the sample of materials being analyzed. Moreover, the histogram may be used to compare different samples of the material and draw conclusions about the properties of the materials.

Optionally, the processor is configured to train the machine learning model for classifying the materials. In this regard, the processor has been set up and programmed to use the dataset to classify materials. The training process involves feeding the dataset into the machine learning model for classifying the materials. Typically, training the machine learning model enables to create a model that can accurately classify new materials based on the patterns and relationships based on the training data. Optionally, the processor is configured to use algorithms and techniques such as gradient descent and backpropagation to obtain training dataset. It will be appreciated that once the training process is complete, the machine learning model can be tested on a separate dataset (called a test dataset) to evaluate its performance and accuracy.

Optionally, the system comprises at least one third detector unit spaced apart by a predetermined second distance from the at least one second detector unit to configure a volume of interest (VOI) between the second detector unit and third detector unit. In this regard, the at least one third detector unit is spaced apart by the predetermined second distance from the at least one second detector unit. Optionally, the predetermined first distance and the predetermined second distance are same. Optionally, the predetermined first distance and the predetermined second distance are different.

The present disclosure also relates to the method for classifying materials as described above. Various embodiments and variants disclosed above apply mutatis mutandis to the method for classifying materials.

Optionally, tracking the high energy particles passing through the VOI by tracking the high energy particles passing through the first detector unit and/or the second detector unit.

Optionally, creating the dataset by:

creating histograms based on the measure of one of the scattering angles or the number of high energy particles, and defining vector values corresponding to the histograms.

Optionally, creating the dataset for each of the samples of materials by tracking high energy particles passing through the VOI for a pre-determined time period.

For example, the each sample of material is measured using the hodoscope having 4 detector units in a 3-1 configuration with the VOI of 247×247×250 mm³. The sample is measured for 8 hours, divided into 30-minute segments to provide every sample with 16 runs of data. The scattering angle for the high energy particles, passing through the at least one hodoscope ranges from 0 to 0.9 degree, the hodoscope detected 287.31 muons/minute and a standard deviation of 23.87 muons/minute. Moreover, the dataset is prepared for each sample of material and the said dataset is used for training the machine learning model. Furthermore, the trained machine learning model can be utilised to classify the material. In particular, the trained machine learning model can used in cargo container inspection, detecting drugs or explosives hidden in large dense metals such as steel or copper and so forth.

As a summary a system for classifying materials is disclosed. The system comprises as discussed: at least one hodoscope comprising at least one first (2D sensitive) detector unit and at least one second (2D sensitive) detector unit, wherein the first detector unit and the second detector unit are spaced apart by a predetermined first distance to configure a volume of interest (VOI) between the first detector unit and the second detector unit. The VOI is configured to receive therein samples of materials within the VOI.

As discussed a processor is communicably coupled to the at least one hodoscope and the processor is configured to reconstruct the VOI using a plurality of spatial resolution units, track high energy particles passing through the VOI by identifying spatial resolution units interacting with the high energy particles, wherein each of the identified spatial resolution units represent one or more features associated with the samples of materials received in the VOI, create a dataset using the one or more features associated with each of the samples of materials, wherein the dataset of each of the samples of materials include a unique data-signature, and train a machine learning model using the dataset of each of the samples of materials for classifying the materials. Indeed each different sample material will create a unique data-signature (or for example trajectory of how high energy particles pass trough the VOI).

This way it is possible efficiently to train a system to classify samples which are placed in VOI. The system is, indeed, first used to generate training dataset to classify different sample materials and sample objects by placing those in to the VOI in a known position in respect to VOI and measuring with hodoscope trajectories of high energy particles passing thru the system. As an example, as we know in which position, which shape and which material the sample is we can use this information together with tracking information (of high energy particles i.e. the unique data-signature) to train the system. Those trajectories (unique data-signatures) are collected and used as a training dataset to train machine learning/artificial intelligence system to classify objects.

The trained system can be used then to classify (identify) unknown objects placed in the system. Trajectories (data-signatures) are measured from the unknown object and trained neural network is used to determine properties of the unknown object by classifying it based on shape, material etc.

DETAILED DESCRIPTION OF THE DRAWINGS

Referring to FIG. 1, illustrated is a schematic illustration of a system 100 for classifying material, in accordance with an embodiment of the present disclosure. The system comprises at least one hodoscope 102 comprising at least one first (2D sensitive) detector unit 104 and at least one second (2D sensitive) detector unit 106A, 106B and 106C (collectively referred as 106). The first detector unit 104 and second detector unit 106 are spaced apart by a predetermined first distance 108 to configure a volume of interest (VOI) 110 between the first detector unit 104 and the second detector unit 106, wherein the VOI 110 is configured to receive therein sample 112 of material within the VOI 110.

The system also comprises a processor 114 communicably coupled to the hodoscope 102, wherein the processor 114 is configured to: reconstruct the VOI 110 using a plurality of spatial resolution units 116. The processor 114 is also configured to track high energy particles passing through a VOI 110 by identifying spatial resolution units 116 interacting with the high energy particles, wherein each of the identified spatial resolution units 116 represent one or more features associated with the sample 112 of material received in the VOI 110, create a dataset using the one or more features associated with each of the samples 112 of materials, wherein the dataset of each of the sample 112 of material include a unique data-signature, and train a machine learning model using the dataset of each of the sample 112 of material for classifying the material.

As shown, the VOI 110 and the plurality of spatial resolution units 116 are cubic in shape, and wherein each of the spatial resolution units 116 has a volume, multiplying and arranging, constitute the VOI 110. The processor is configured to track the high energy particles passing through the VOI 110 by tracking the high energy particles passing through the first detector unit 104 and/or the second detector unit 106. The one or more features associated with the sample 112 of material comprise measure of one of a scattering angles or a number of high energy particles passing through each of the spatial resolution units 116 interacting with the high energy particles. The processor 114 is configured to create the dataset by creating histograms and defining vector values corresponding to the histograms. The processor 114 is configured to create the dataset for each of the samples of materials by tracking high energy particles passing through the reconstructed VOI 110 for a pre-determined time period.

Referring to FIG. 2, there is shown steps 200 of a method for classifying materials, in accordance with an embodiment of the present disclosure. At step 202, a volume of interest (VOI) using a plurality of spatial resolution units is reconstructed, wherein the VOI is configured to receive therein samples of materials within the VOI. At step 204, high energy particles are tracked, passing through the VOI by identifying spatial resolution units interacting with the high energy particles, wherein each of the identified spatial resolution units represent one or more features associated with the samples of materials received in the VOI. At step 206, a dataset using the one or more features associated with each of the samples of materials is created, wherein the dataset of each of the samples of materials include a unique data-signature. At step 208, a machine learning model is trained using the dataset of each of the samples of materials for classifying the materials.

The steps 202, 204, 206 and 208 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for classifying materials, the system comprising:

at least one hodoscope comprising at least one first (2D sensitive) detector unit and at least one second (2D sensitive) detector unit, wherein the first detector unit and the second detector unit are spaced apart by a predetermined first distance to configure a volume of interest (VOI) between the first detector unit and the second detector unit, wherein the VOI is configured to receive therein samples of materials within the VOI, and wherein the at least one first detector unit and the at least one second detector unit are arranged to detect pulses of high energy particles passing through the at least one hodoscope; and a processor communicably coupled to the at least one hodoscope, wherein the processor is configured to:

reconstruct the VOI using a plurality of spatial resolution units, track high energy particles passing through the VOI by identifying spatial resolution units interacting with the high energy particles, wherein each of the identified spatial resolution units represents one or more features associated with the samples of materials received in the VOI, and wherein the one or more features associated with the samples of materials comprise measure of one of scattering angles and a number of high energy particles passing through each of the spatial resolution units interacting with the high energy particles, create a dataset by creating a mean angle histogram that provides the scattering angel values and a density histogram that provides the high energy particles, and defining vector values corresponding to the histograms and using the one or more features associated with each of the samples of materials, wherein the dataset of each of the samples of materials include a unique data-signature, and train a machine learning model using the dataset of each of the samples of materials for classifying the materials.

2. The system according to claim 1, wherein the VOI and the plurality of spatial resolution units are cubic in shape, and wherein each of the spatial resolution units has a volume, multiplying and arranging, constitute the VOI.

3. The system according to claim 1, wherein the processor is configured to track the high energy particles passing through the VOI by tracking the high energy particles passing through the first detector unit and/or the second detector unit.

4. The system according to claim 1, wherein the processor is configured to create the dataset for each of the samples of materials by tracking high energy particles passing through the reconstructed VOI for a pre-determined time period.

5. The system according to claim 1, wherein the processor is configured to create the dataset for each of the samples of materials by tracking high energy particles passing through the at least one hodoscope.

6. The system according to claim 1, wherein the samples of materials having predetermined size and is placed at a predetermined position within the VOI.

7. The system according to claim 1, wherein the processor is configured to train the machine learning model for classifying the materials.

8. The system according to claim 1, wherein the machine learning technique is selected from at least one of: Linear Discriminant Analysis (LDA), Neural Network (NN), LDA One-vs-One (1v1).

9. The system according to claim 1, wherein the system comprises at least one third detector unit spaced apart by a predetermined second distance from the at least one second detector unit to configure a volume of interest (VOI) between the second detector unit and third detector unit.

10. A method for classifying materials, the method comprising:

reconstructing, by a processor, a volume of interest (VOI) using a plurality of spatial resolution units, wherein the VOI is configured to receive therein samples of materials within the VOI, wherein at least one hodoscope is communicably coupled to the processor, wherein the at least one hodoscope comprising at least one first (2D sensitive) detector unit and at least one second (2D sensitive) detector unit, wherein the first detector unit and the second detector unit are spaced apart by a predetermined first distance to configure the VOI between the first detector unit and the second detector unit, and wherein the at least one first detector unit and the at least one second detector unit are arranged to detect pulses of high energy particles passing through the at least one hodoscope, tracking, by the processor, high energy particles passing through the VOI by identifying spatial resolution units interacting with the high energy particles, wherein each of the identified spatial resolution units represent one or more features associated with the samples of materials received in the VOI, and wherein the one or more features associated with the samples of materials comprise measure of one of scattering angles and a number of high energy particles passing through each of the spatial resolution units interacting with the high energy particles, creating, by the processor, a dataset by creating a mean angle histogram that provides the scattering angel values and a density histogram that provides the high energy particles, and defining vector values corresponding to the histograms and using the one or more features associated with each of the samples of materials, wherein the dataset of each of the samples of materials include a unique data-signature, and training, by the processor, a machine learning model using the dataset of each of the samples of materials for classifying the materials.

11. The method according to claim 10, wherein tracking the high energy particles passing through the VOI by tracking the high energy particles passing through the first detector unit and/or the second detector unit.

12. The method according to claim 10, wherein creating the dataset for each of the samples of materials by tracking high energy particles passing through the VOI for a predetermined time period.

13. The system according to claim 1, wherein vectors associated with the mean angle histogram and the density histogram are concatenated into a single vector (Vc).

14. The system according to claim 1, wherein each sample of material is measured for a predetermined time period divided into predefined time segments.

\* \* \* \* \*